(12) United States Patent
Zhang et al.

(10) Patent No.: US 11,175,804 B2
(45) Date of Patent: Nov. 16, 2021

(54) DEPLOYING USER INTERFACE ELEMENTS ON A SCREEN

(71) Applicant: International Business Machines Corporation, Armonk, NY (US)

(72) Inventors: Xue Lan Zhang, Beijing (CN); Dong Jun Zong, Beijing (CN); Jin Zhang, Beijing (CN); Zhun Huang, Beijing (CN); Yuan Jie Zhang, Ningbo (CN); Yan Xiu Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/668,260

(22) Filed: Oct. 30, 2019

(65) Prior Publication Data

US 2021/0132756 A1     May 6, 2021

(51) Int. Cl.
*G06F 3/0484*     (2013.01)
*G06F 3/0488*     (2013.01)

(52) U.S. Cl.
CPC .......... *G06F 3/0484* (2013.01); *G06F 3/0488* (2013.01)

(58) Field of Classification Search
None
See application file for complete search history.

(56) References Cited

U.S. PATENT DOCUMENTS

| 9,207,804 | B2 | 12/2015 | Cudak et al. |
| 2009/0171920 | A1* | 7/2009 | Wade .................... G06F 16/951 |
| 2014/0152583 | A1 | 6/2014 | Bastide et al. |
| 2015/0193074 | A1* | 7/2015 | Cudak ..................... G06F 11/07 |
| | | | 345/173 |
| 2016/0299616 | A1* | 10/2016 | Crowther .............. G06F 1/1643 |
| 2017/0242676 | A1* | 8/2017 | Frayssignes .......... G06F 40/126 |
| 2018/0268783 | A1* | 9/2018 | Woo ........................ G09G 5/373 |
| 2018/0342050 | A1* | 11/2018 | Fitzgerald ................. G06T 7/13 |
| 2019/0196656 | A1 | 6/2019 | Crowther et al. |

FOREIGN PATENT DOCUMENTS

| CN | 101685342 A | 1/2012 |
| CN | 105302375 B | 7/2018 |

OTHER PUBLICATIONS

"How to split and move the keyboard on your iPad", Apple, printed Oct. 30, 2019, 3pages. https://support.apple.com/en-US/HT207521.
Ryan, "How do I undock the keyboard on SwiftKey for Android?", SwiftKey, Blog, Aug. 7, 2015, 5 pages. https://blog.swiftkey.com/how-do-i-undock-the-keyboard-on-swiftkey-for-android/.
Welch, "Help, My iPad Keyboard Is Stuck in the Middle of My Screen!", Noobie, Jul. 30, 2019, 22 pages. https://www.noobie.com/help-my-ipad-keyboard-is-stuck-in-the-middle-of-my-screen/.
Mell et al., "The NIST Definition of Cloud Computing", Recommendations of the National Institute of Standards and Technology, Sep. 2011, U.S. Department of Commerce, 7 pages.

* cited by examiner

*Primary Examiner* — Ryan Barrett
(74) *Attorney, Agent, or Firm* — Scott S. Dobson

(57) ABSTRACT

The present disclosure relates to a method and system for deploying user interface elements on a screen which has broken-faulty regions on the screen. One or more broken-faulty regions are detected on the screen. At least a part of the normal regions on the screen is determined to be a region for displaying at least a part of one or more user interface elements which are related to the one or more broken-faulty regions. The at least a part of the one or more user interface elements are deployed on the screen based on the result of the determining.

20 Claims, 14 Drawing Sheets

DEPLOYING USER INTERFACE ELEMENTS ON A SCREEN

BACKGROUND

The present disclosure relates to screen display, and more specifically, to a method, system and computer program product for deploying user interface elements on a screen on which broken-faulty regions are contained.

A user usually makes interaction with a computing device through a screen of the computing device, such as displaying information and even receiving information if the screen is a touch screen. Screens comprise physical functional regions on which pressure sensitive units, temperature sensitive units, biological information sensitive units or combinations of the above sensitive units are integrated to respond to human-machine interactive operations. Furthermore, user interface elements have been allocated and displayed on screens for information displaying, operation prompt or position assistance, etc. In the technical field of portable intelligent computing and/or communication devices, a significant trend is that screens of computing devices are becoming bigger and thinner in order to achieve higher display resolutions and lighter total weight.

SUMMARY

According to one or more embodiments of the present disclosure, there is provided a computer-implemented method. The method comprises detecting one or more broken-faulty regions on a screen, for instance, a screen of a computing device. The method further comprises determining at least a part of normal regions on the screen of the computing device to be a region for displaying at least a part of the one or more user interface elements. The at least a part of the one or more user interface elements are related to the one or more broken-faulty regions. The method further comprises deploying the at least a part of the one or more user interface elements on the screen.

According to one or more embodiments of the present disclosure, the method can also be implemented as a system and/or computer program product.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
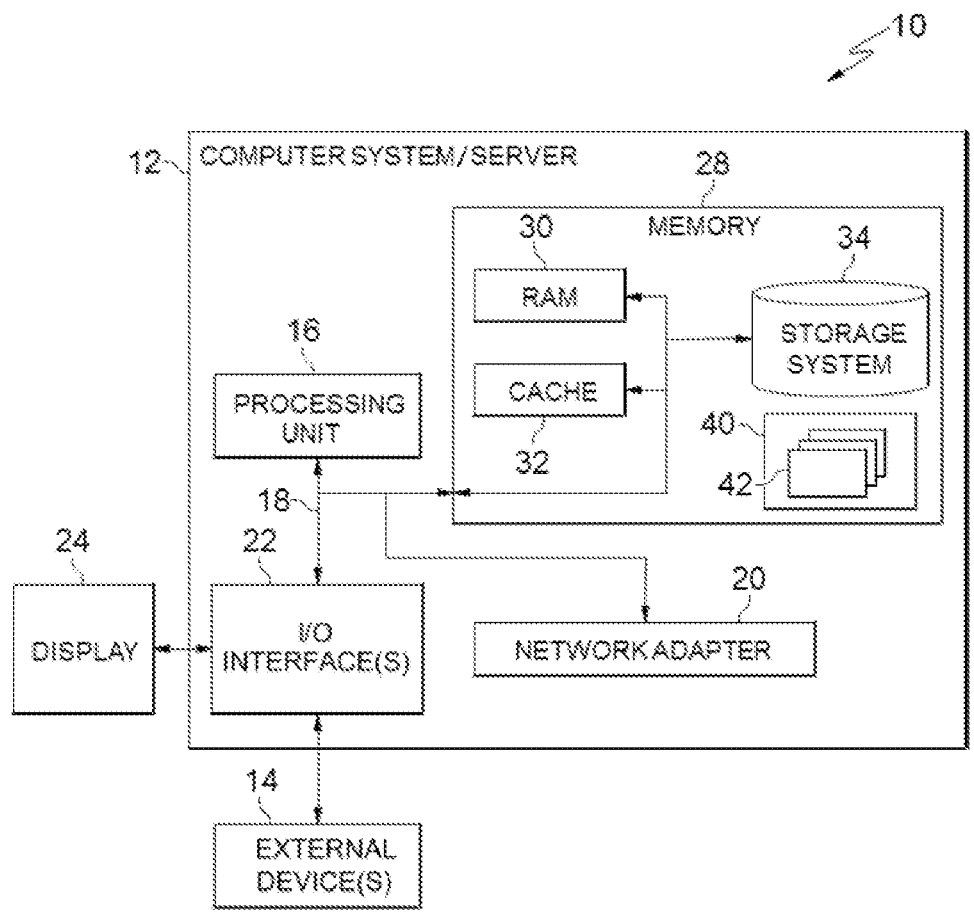
FIG. 1 depicts a cloud computing node according to an embodiment of the present invention.

According to extreme increases in screen sizes and thickness for portable usage requirements, failure risks of screens are also increased such as physical damage, electronic faults, abnormal displaying and the like. As a result, user interface elements might be allocated and displayed on the broken or faulty regions of screens, thus the user interface elements might be incorrectly/incompletely displayed on screens or may fail to respond correctly to human-machine interaction. These problems are difficult to be resolved by repairing. Frequently the whole screen of a computing device has to be replaced in the art. Generally, computing devices equipped with the screen can continue to operate in this status, however, visual effect of the screen is affected since some user interface elements might disappear in the region of physical damage.

Generally, the present disclosure is associated with methods for human-machine interaction used in computing devices, especially portable computing and/or communication devices. In particular, the present disclosure provides a method for deploying user interface elements to implement normal human-machine interactive functions based on determining normal regions on a screen of a computing device for displaying user interface elements, which are originally displayed or to-be-displayed on the one or more broken-faulty regions on the screen. In real usage environments, it is difficult to repair one or more broken-faulty regions of the screen of the computing device, so the screen, even the whole computing device, may need to be replaced. Thus, methods to reduce repairing(replacement) costs and extend lifecycle of the screen of the computing device with partial broken or fault regions are preferred. Also, the present disclosure is valuable as a temporary alternative solution when the user of the computing device has no time or conditions to repair or replace such screen for a period of time.

In addition, in order to test and identify physical broken or functional fault regions on a screen of a computing device, some additional fault diagnosis/examination devices may need to be employed such as, for example, optical fault detectors. In real usage environments, however, users might want to continue to use their computing devices, notwithstanding screens of computing devices having some broken or faulty regions. It is recognized that it is generally difficult to employ testing or examination results obtained from the additional fault diagnosis or examination devices generally to deploy user interface elements by means of adjusting positions or areas of the user interface elements to avoid displaying the user interface elements in the broken or faulty regions. Thus, methods for testing and identifying physically broken or functionally faulty regions on the screen of the computing device so as to assist to re-layout and deploy the user interface elements outside of the broken or faulty regions are preferred in this disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
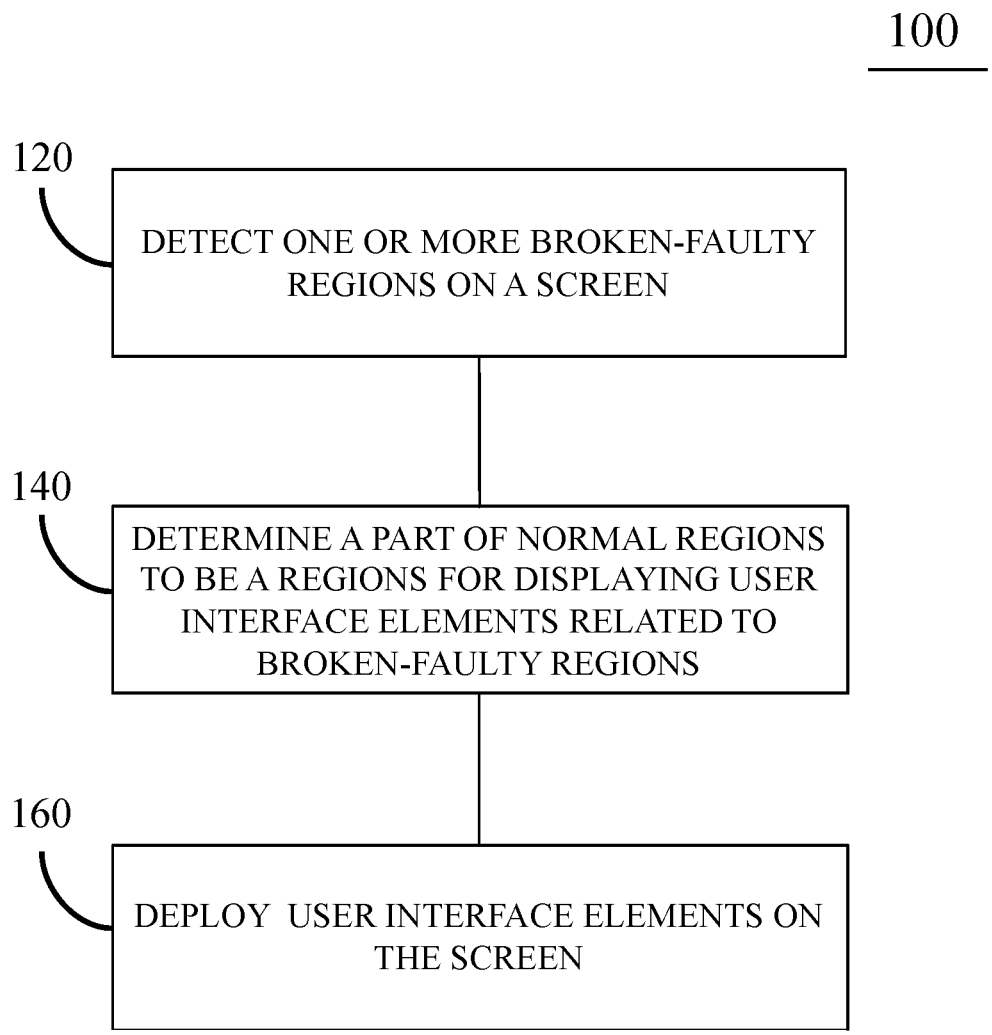
FIG. 2 depicts a process flow chart of a method for deploying user interface elements on a screen of a computing device according to embodiments of the present disclosure.

With reference now to FIG. 2, in which a process flow 100 chart of a method for deploying user interface elements on a screen is depicted according to embodiments of the present disclosure. For example, the process flow 100 may be a correlated sampling in regards to deploying user interface elements on a screen of a computing device by means of one or more processors in the computing device such as, for example, a cell phone, a PDA (Personal Digital Assistant), a laptop or a tablet, etc.

The process flow 100 begins at step 120, where one or more broken-faulty regions on a screen of a computing device may be detected. In some embodiments, the screen is a component of a human-machine interactive device incorporated into a computing device such as, for example, a smartphone equipped with a touch screen. The screen of the computing device may be employed for displaying one or more user interface elements and other visual information, for instance, a virtual keyboard, buttons, operation prompts, webpages, videos, etc. The one or more user interface elements might cause the computing device to respond to user's operations by means of user executing an operational action upon a part of the one or more user interface elements or all of user interface elements.

At step 140, the computing device determines a part of or all of normal regions on the screen of the computing device for displaying user interface elements which are related to one or more broken-faulty regions. In the present disclosure, the one or more user interface elements related to the one or more broken-faulty regions are displayed or are to be displayed on the one or more broken-faulty regions. In some examples, all of the one or more user interface elements have been displayed or are to be displayed on the one or more broken-faulty regions. In other examples, only a part of the one or more user interface elements has been displayed or are to be displayed on the one or more broken-faulty regions.

At step 160, the computing device deploys the one or more user interface elements related to the one or more broken-faulty regions on the screen based on result of the determining.

In one or more embodiments of the present disclosure, the screen of the computing device is a touch screen. Touch screens are display devices that allow users to interact with computing devices by using their fingers or styluses. Touch screens are useful alternatives to mouse or keyboards for navigating GUIs (graphical user interfaces). Touch screens are used on a variety of computing devices, such as computers, laptops, smartphones, tablets, cash registers, and information kiosks. In some examples, touch screens used grids of touch-sensitive units to receive input of fingers or styluses, for instance, pressure sensitive units, temperature sensitive units or pressure-temperature combined sensitive unites, etc. In other examples, touch screens use grids of infrared beams to sense the presence of fingers instead of utilizing touch-sensitive input.

In one or more embodiments of the present disclosure, the one or more user interface elements are virtual keys of a virtual keyboard. In the present disclosure, a virtual keyboard is used to mean a soft keyboard comprising a set of virtual keys, which appears on a screen as an image map. In some embodiments, a software-based keyboard can be customized Depending on host system and specific software, a user (who may be someone unable to use a regular keyboard) can use a touch screen or a mouse to select virtual keys.

Figure 3:
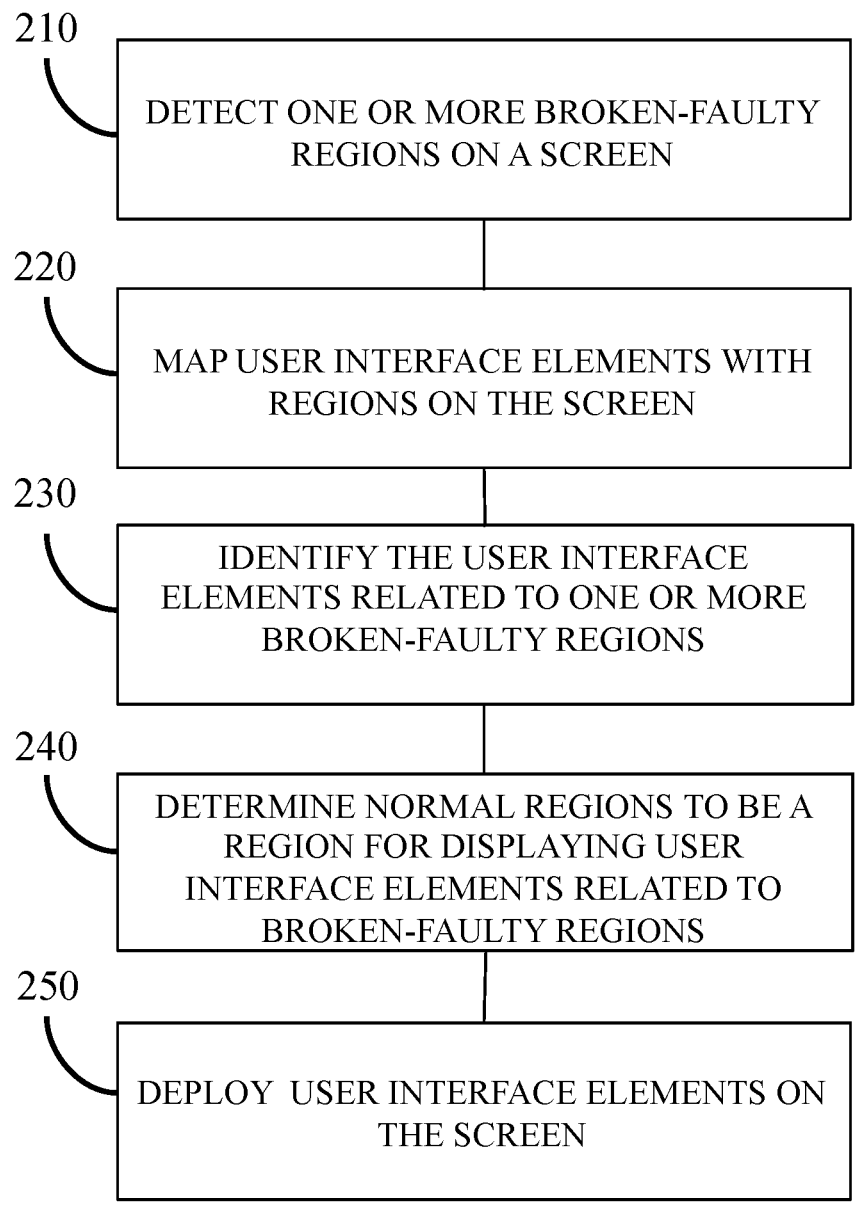
FIG. 3 depicts a flow chart of a method on deploying user interface elements on a screen of a computing device according to embodiments of the present disclosure.

With reference now to FIG. 3, a flow chart 200 of a method for deploying user interface elements on a screen of a computing device is depicted according to embodiments of the present disclosure.

The example method depicted in the flow chart 200 comprises more specific steps, which further comprises identifying at least a part of user interface elements related to one or more broken-faulty regions on a screen of a computing device based on mapping the one or more user interface elements with the one or more broken-faulty regions, furthermore, determining the at least a part of the normal regions on the screen of the computing device for displaying the one or more user interface elements identified to be related to the one or more broken-faulty regions.

The process flow 200 begins at step 210, where one or more broken-faulty regions on a screen of a computing device may be detected. The screen of the computing device may be integrated into a computing device, such as the computer system/server 12 depicted in FIG. 1, for displaying information including user interface elements.

At step 220, the computing device maps the one or more user interface elements to regions on the screen. The regions comprise the one or more broken-faulty regions. In some examples, position coordinates, referred to edges of the screen, of the one or more user interface elements are compared with position coordinates, referred to edges of the screen, of profiles of the one or more broken-faulty regions, for determining the one or more user interface elements to be allocated into the one or more broken-faulty regions.

At step 230, the at least a part of the one or more user interface elements related to the one or more broken-faulty regions are identified based on the mapping. For example, the one or more user interface elements may be related to the one or more broken-faulty regions if the position coordinates of the one or more user interface elements are included in areas of the one or more broken-faulty regions. In some examples, the at least a part of the one or more user interface elements related to the one or more broken-faulty regions are displayed on the one or more broken-faulty regions. In other examples, the at least a part of the one or more user interface elements related to the one or more broken-faulty regions are not displayed now but programmed to be allocated in the one or more broken-faulty regions.

At step 240, the computing device determines the at least a part of the normal regions on the screen of the computing device for displaying the at least a part of the one or more user interface elements. The one or more user interface elements are identified to be related to the one or more broken-faulty regions.

In one or more embodiments of the present disclosure, the area of the one or more user interface elements is less than area of the at least a part of the normal regions, thus all of the one or more user interface elements are determined to be displayed on the at least a part of the normal regions.

In one or more embodiments of the present disclosure, the area of the one or more user interface elements is larger than the area of the at least a part of the normal regions, but area of the at least a part of the one or more user interface elements identified to be related to the one or more broken-faulty regions is less than the area of the at least a part of the normal regions, so that only the at least a part of the one or more user interface elements which are identified to be related to the one or more broken-faulty regions are determined to be displayed on the at least a part of the normal regions.

In one or more embodiments of the present disclosure, either of the area of the one or more user interface elements and the area of the at least a part of the one or more user interface elements related to the one or more broken-faulty regions is larger than the area of the normal regions. As a result, the at least a part of the one or more user interface elements related to the one or more broken-faulty regions are split into a plurality of corresponding blocks in accordance with shapes and areas of the normal regions. The plurality of corresponding blocks can fulfill to be displayed on the normal regions.

At step 250, the computing device deploys the one or more user interface elements related to the one or more broken-faulty regions on the screen based on result of the determining.

Figure 4A:
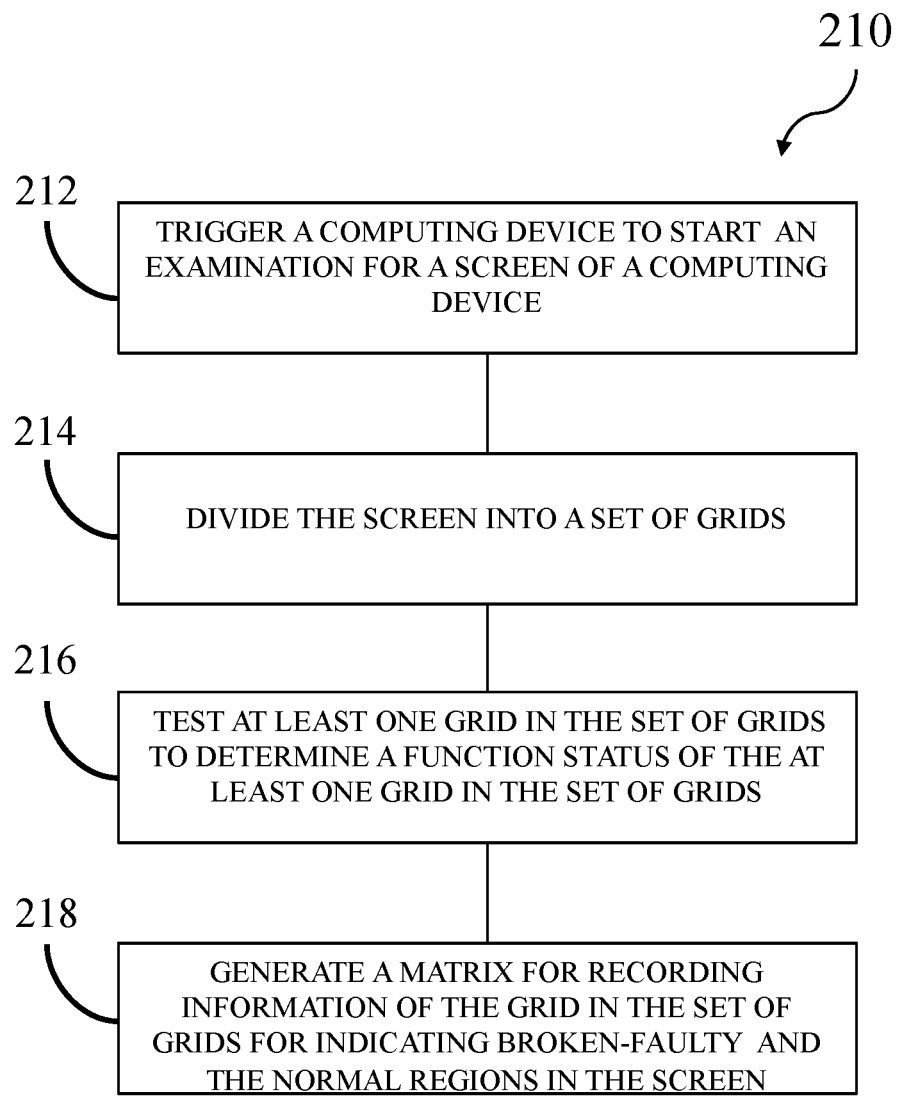
FIG. 4A depicts a flow chart of a method for implementing step 210 in FIG. 3 according to embodiments of the present disclosure.

With reference now to FIG. 4A, in which a flow chart of a method for implementing step 210 in FIG. 3 is depicted according to embodiments of the present disclosure. Also, the example operation in FIG. 4A could be comprised in the example method depicted in FIG. 2 and FIG. 6 for gaining the desired effect. The example operation further comprises more specific steps, which further comprises triggering the computing device to start an examination for the screen of the computing device. During the examination for the screen of the computing device, the computing device may divide the screen into a set of grids. Furthermore, the computing device may test at least one grid in the set of grids to determine a function status of the at least one grid in the set of grids. The function status may be either broken-faulty or normal. Furthermore, the computing device may generate a matrix for recording the function status and position and area of the at least one grid in the set of grids to indicate the one or more broken-faulty regions of the screen.

The process flow of the example operation in FIG. 4A begins at step 212, where a computing device, such as the computer system/server 12 depicted in FIG. 1, is triggered to start an examination for a screen of a computing device. The screen displays information including user interface elements.

At step 214, the computing device divides the screen into a set of grids. In some examples, the set of grids is composed of squares with same areas. The grids may be also composed of other polygons with the different areas according to actual requirements.

At step 216, the computing device tests at least one grid unit in the set of grids to determine a function status of the at least one grid unit in the set of grids. The function status may be either broken-faulty or normal.

In one or more embodiments of the present disclosure, the operation of testing at least one grid unit in the set of grids to determine a function status of the at least one grid unit in the set of grids further comprises displaying a testing image in the at least one grid unit in the set of grids and identifying the function status in accordance to displaying effect of the testing image in the at least one grid unit of the set of grids by users or detecting devices. For example, a background canvas may be displayed on the screen as a reference substance and a user employs his/her finger to slide on the screen to draw lines in different color from the background canvas on the screen and detect whether the lines are correctly displayed on one grid unit of the grids to determine the function status of the one grid unit of the grids. If one grid unit of the grids does not correctly display the lines, the testing result of the one grid unit may be broken-faulty. Conversely, the testing result of the one grid unit may be normal if the one grid unit of the grids correctly displays the lines. Furthermore, the user may input the testing result, such as broken-faulty functional status, into the computing device by means of a corresponding activity such as, for example, clicking on the screen positions of the broken-faulty regions located by the grids in accordance with the testing result.

In one or more embodiments of the present disclosure, the operation of testing at least one grid in the set of grids to determine a function status of the at least one grid in the set of grids could employ available testing methods or devices in the art to gain testing results such as, for example, microscopes, cameras or other optical testing devices. The testing devices can detect work status of the grid units on the screen and process the testing data to generate an available testing result. Furthermore, the available testing result may be inputted into the computing device by means of available methods and technologies in the art, such as cables, wireless communications or networks, etc.

At step 218, the computing device generates a matrix for recording the function status and position and area of the at least one grid unit in the set of grids for indicating the one or more broken-faulty regions and/or the normal regions on the screen.

In one or more embodiments of the present disclosure, one or more broken-faulty regions comprise one or more blocks composed of interconnected grids with the function status of broken-faulty. Similarly, normal regions comprise one or more blocks composed of interconnected grids with the function status of normal.

In one or more embodiments of the present disclosure, the one or more broken-faulty regions further comprise one or more isolated sole grids with the function status of broken-faulty. Similarly, the normal regions further comprise one or more isolated sole grids with the function status of normal.

Figure 4B:
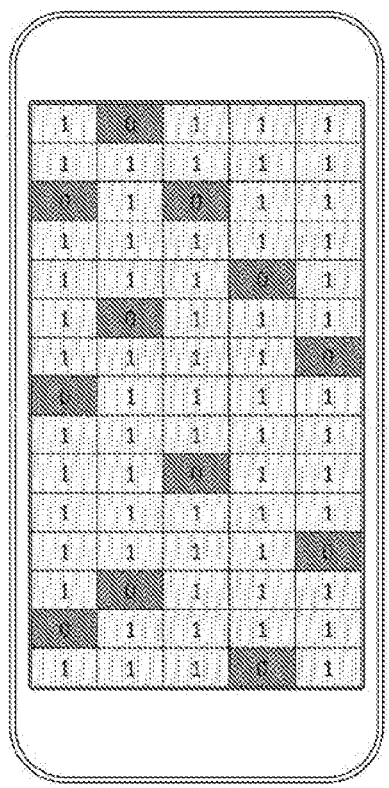
FIG. 4B depicts an exemplary interface for implementing the method in FIG. 4A according to embodiments of the present disclosure.

With reference now to FIG. 4B, an example interface for implementing the method in FIG. 4A is depicted according to embodiments of the present disclosure. FIG. 4B is for illustrating a matrix of grids based on a set of grids for recording the function status and position and area of the at least one grid in the set of grids to indicate the one or more broken-faulty regions of the screen.

As shown in FIG. 4B, an example portable computing device equipped with a screen is depicted. The computing device may be triggered to start an examination for the screen of the computing device to detect broken-faulty regions on the screen. For the examination purpose, the screen may be divided to a set of grids which is composed of rectangles grid units with same areas. Furthermore, all grid units of the grids may be tested to determine the function status of each grid unit in the set of grids. In accordance with the testing result, a matrix of grids may be generated to record related information for indicating the one or more broken-faulty regions and/or the normal regions on the screen. As area of the set of girds is equal to area of the screen of the computing device, the matrix can record the functional statuses of full screen by means of the grid units. In the embodiment of the present disclosure in FIG. 4B, one grid unit of the grids is given a status value 1 if the one grid unit of the grids has a normal function status. Conversely, one grid unit of the grids is given a status value 0 if the one gird unit of the grids has a function status of broken-faulty. Meanwhile, the matrix records corresponding position and area of each grid unit in the girds for mapping the user interface elements with the broken-faulty regions based on the grids.

Figure 5:
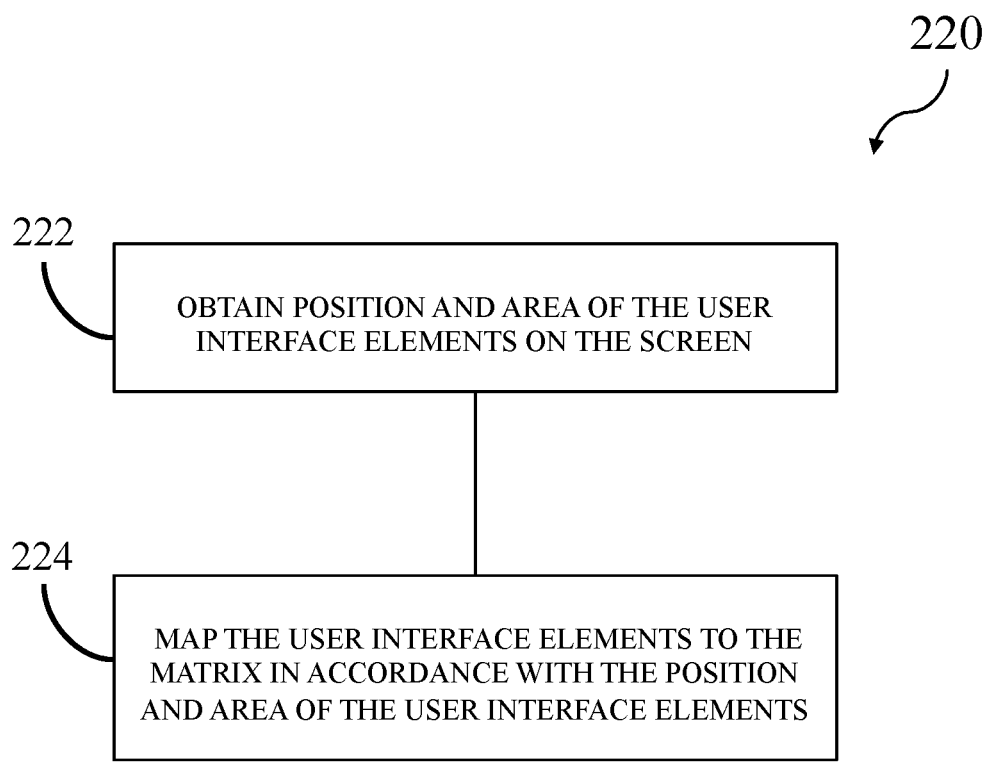
FIG. 5 depicts a flow chart of a method for implementing step 220 in FIG. 3 according to embodiments of the present disclosure.

With reference now to FIG. 5, a flow chart of a method for implementing step 220 in FIG. 3 is depicted according to embodiments of the present disclosure. The example operation in FIG. 5 could be comprised or combined with the example operation depicted in FIG. 4A or in FIG. 6 for gaining the desired effect.

The process flow of the example operation in FIG. 5 begins at step 222, where the computing device, such as the computer system/server 12 depicted in FIG. 1, obtains position and area of at least one of the user interface elements on the screen.

At step 224, the computing device maps the at least one of user interface elements with the matrix in accordance with the position and area of the user interface elements and the one or more broken-faulty regions recorded in the matrix.

In one or more embodiments of the present disclosure, the computing device identifies at least a part of the user interface elements related to the one or more broken-faulty regions by means of mapping or comparing the position and area of the user interface elements and the one or more broken-faulty regions recorded in the matrix. The user interface elements related to the one or more broken-faulty regions are identified in according to the mapping or the comparing result which indicates the at least a part of the user interface elements are located in the one or more broken-faulty regions.

In one or more embodiments of the present disclosure, the mapping or comparing result is that the position of the at least a part of the user interface elements are located in the center of the one or more broken-faulty regions as well as area of the at least a part of the user interface elements are not larger than the area of the one or more broken-faulty regions. The mapping or comparing result indicates the at least a part of the user interface elements are displayed or are to be displayed on the one or more broken-faulty regions. As a result, the at least a part of the user interface elements related to the one or more broken-faulty regions are identified.

Figure 6A:
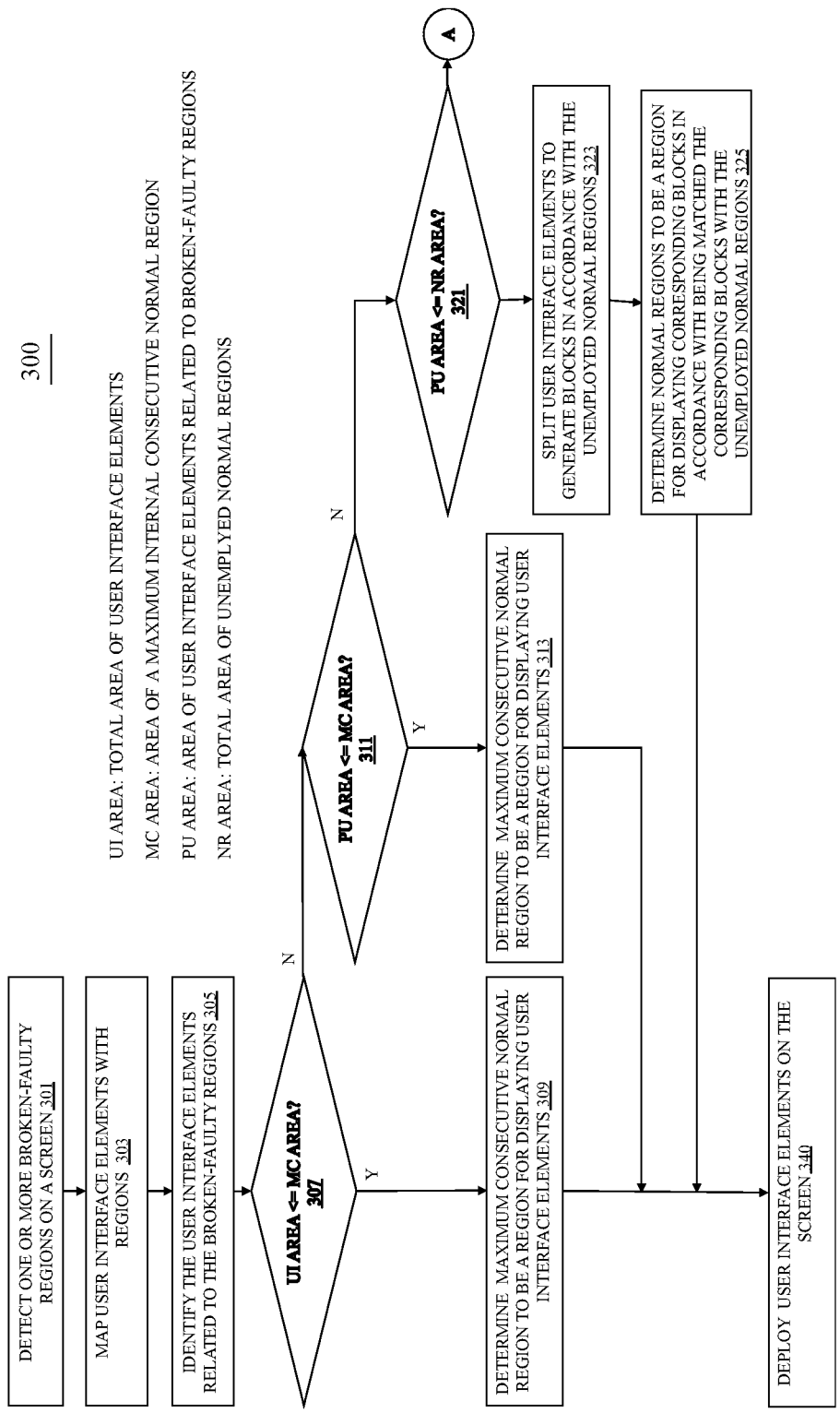
FIG. 6A depicts a detailed flow chart of a method for deploying user interface elements on a screen of a computing device according to embodiments of the present disclosure.
Figure 6B:
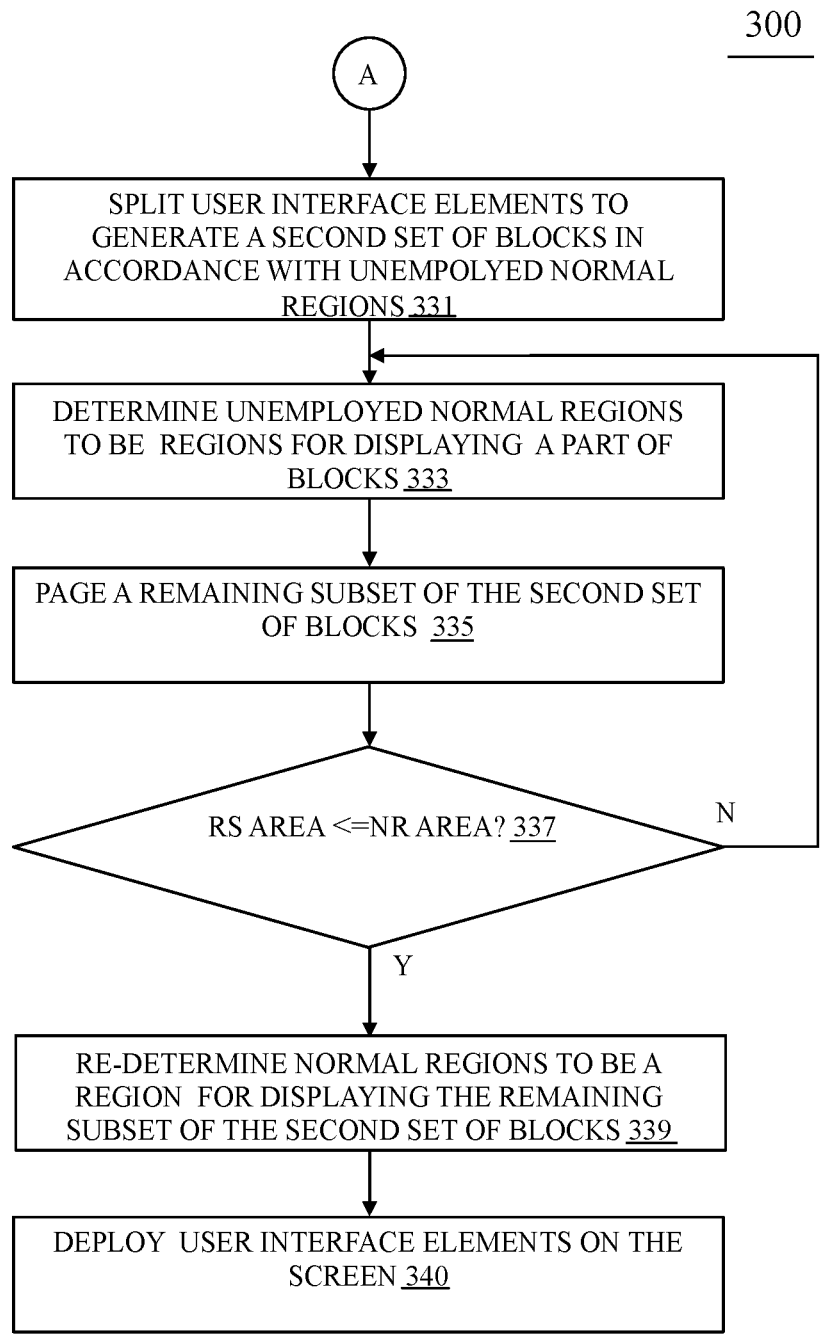
FIG. 6B depicts a continued flow chart of the method shown in FIG. 6A according to embodiments of the present disclosure.

With reference now to FIGS. 6A and 6B, a detailed flow chart 300 of a method for deploying user interface elements on a screen of a computing device is depicted according to embodiments of the present disclosure. Meanings of abbreviations presented in FIGS. 6A and 6B are listed at below:

UI area is total area of user interface elements;

MC area is area of a maximum internal consecutive normal region;

PU area is area of user interface elements related to broken-faulty regions;

NR area is total area of unemployed normal regions; and

RS area is area of the remaining subset of blocks.

The process flow chart 300 begins at step 301, where one or more broken-faulty regions on a screen of a computing device are detected. The screen of the computing device may be integrated into the computing device, such as the computer system/server 12 depicted in FIG. 1, for displaying information including user interface elements.

At step 303, the computing device maps the one or more user interface elements with the one or more broken-faulty regions. In some embodiments, position coordinates of the one or more user interface elements are compared with position coordinates of profiles of the one or more broken-faulty regions, for determining the one or more user interface elements to be allocated into the one or more broken-faulty regions.

At step 305, the at least a part of the one or more user interface elements related to the one or more broken-faulty regions are identified in accordance with position and area, for instance, the position coordinates, in reference to the edges of the screen, of the one or more user interface elements included in areas of the one or more broken-faulty regions.

At step 307, total area of the one or more user interface elements (UI area) is compared with area of a maximum internal consecutive normal subregion (MC area) in the normal regions.

In one or more embodiments of the present disclosure, an internal consecutive normal subregion is a part or all of a normal region and does contain broken-faulty region, and the internal consecutive normal subregion comprises a closed and convex profile line.

The maximum internal consecutive normal subregion has the maximum area among of internal consecutive normal subregions on the normal regions.

If the total area of the one or more user interface elements is not larger than the area of the maximum internal consecutive normal subregion, the process flow chart 300 continues to execute step 309.

At step 309, the maximum internal consecutive normal subregion is determined to be a region for displaying the one or more user interface elements. In some examples, the one or more user interface elements are rotated for correctly displaying on the maximum internal consecutive normal subregion. In other examples, the one or more user interface elements are recombined by changing shapes for matching with shape of the maximum internal consecutive normal subregion while the total area of the one or more user interface elements are remained as the same as the original total area.

At step 340, the computing device deploys the one or more user interface elements related to the one or more broken-faulty regions on the maximum internal consecutive normal subregion based on result of the determining, for instance, the result of the determining in step 309. Thereof, the one or more user interface elements are deployed on the maximum internal consecutive normal subregion.

If the area of the one or more user interface elements is not larger than the area of the maximum internal consecutive normal subregion, the process flow chart 300 proceeds to execute step 311.

At step 311, area of the at least a part of the one or more user interface elements related to the one or more broken-faulty regions (PU area) is compared with the area of the maximum internal consecutive normal subregion.

If the area of the at least a part of the one or more user interface elements is not larger than the area of the maximum internal consecutive normal subregion, the process flow chart 300 continues to execute step 313.

At step 313, the maximum internal consecutive normal subregion is determined to be a region for displaying the at least a part of the one or more user interface elements. The at least a part of the one or more user interface elements related to the one or more broken-faulty regions are identified. In some examples, the at least a part of the one or more user interface elements are rotated for correctly being displayed on the maximum internal consecutive normal subregion. In other examples, the at least a part of the one or more user interface elements are recombined by changing shapes for matching with shape of the maximum internal consecutive normal subregion while keeping the area of the at least a part of the one or more user interface elements remained as the same as the original area of the at least a part of the one or more user interface elements.

At step 340, the computing device deploys the one or more user interface elements related to the one or more broken-faulty regions on the maximum internal consecutive normal subregion based on result of the determining, for instance, the result of the determining at step 313. Thus, the at least a part of the one or more user interface elements are deployed on the maximum internal consecutive normal subregion.

If the area of the at least a part of the one or more user interface elements is larger than the area of the maximum internal consecutive normal subregion, the process flow chart 300 proceeds to execute step 321.

At step 321, area of the at least a part of the one or more user interface elements related to the one or more broken-faulty regions is compared with total area of unemployed normal regions (NR area) by the computing device. In the present disclosure, the unemployed normal regions are normal regions which are not employed to display or to be programmed to display user interface elements before execution of determining or re-determining.

If the area of the at least a part of the one or more user interface elements is not more than the total area of the unemployed normal regions, the process flow chart 300 continues to execute step 323.

At step 323, the at least a part of the one or more user interface elements, related to the one or more broken-faulty regions, are split to generate a first set of blocks in accordance with shapes and areas of at least a part of unemployed normal regions. Shapes and areas of the first set of blocks are for fulfilling to display all of the first set of blocks in the at least a part of the unemployed normal regions.

At step 325, at least a part of the unemployed normal regions are determined to be regions for displaying corresponding blocks of the first set of blocks in accordance with shapes and areas of the corresponding blocks of the first set of blocks being matched with the region shapes and region areas of the at least a part of the unemployed normal regions. For instance, one of the first set of blocks is split from the at least a part of the one or more user interface elements in accordance with the region shape and region area of one region of the unemployed normal regions, as a result, the one of the first set of blocks is accordingly determined to be displayed on the one region of the unemployed normal regions. In some examples, the part of the first set of blocks are rotated for correctly displayed on the unemployed normal regions. In other examples, the part of the first set of blocks are recombined by changing block shapes for matching with region shapes of the at least a part of unemployed normal regions while keeping the areas of the at least a part of the first set of blocks remained as the same as the original areas before recombination.

At step 340, the computing device deploys the one or more user interface elements related to the one or more broken-faulty regions on the screen based on result of the determining, for instance, the result of the determining at step 325. Thereof, the at least a part of the one or more user interface elements are deployed on the at least a part of unemployed normal regions by means of the corresponding blocks of the first set of blocks which are split in accordance with region shapes and region areas of the at least a part of unemployed normal regions.

If the area of the at least a part of the one or more user interface elements are more than the total area of the unemployed normal regions, the process flow chart 300 proceeds to execute step 331 in FIG. 6B.

At step 331, the at least a part of the one or more user interface elements related to the one or more broken-faulty regions, are split to generate a second set of blocks in accordance with region shapes and region areas of the unemployed normal regions. Block shapes and block areas of the second set of blocks are for displaying all of the second set of blocks in the unemployed normal regions.

At step 333, the unemployed normal regions are determined to be regions for displaying a part of the second set of blocks in accordance with the region shapes and region areas of the corresponding blocks being matched to the region shapes and region areas of the unemployed normal regions. Area of the part of the second set of blocks is not more than the total area of the unemployed normal regions. For instance, one of the second set of blocks is split from the at least a part of the one or more user interface elements in accordance with the region shape and region area of one region of the unemployed normal regions. As a result, the one of the second set of blocks is accordingly determined to be displayed on the one region of the unemployed normal regions. In some embodiments of the present disclosure, area of the part of the second set of blocks is not more than the total area of the unemployed normal regions. In some examples, the part of the second set of blocks are rotated for correctly being displayed on the unemployed normal regions. In other examples, the part of the second set of blocks are recombined by changing block shapes for matching with region shapes of the normal regions while keeping the areas of the part of the second set of blocks remained as the same as the original areas before recombination. The part of the second set of blocks may be displayed on real-time or buffered in memory or storage device to wait for remained part of the second set of blocks being determined to be displayed on unemployed normal regions.

At step 335, a remaining subset of the second set of blocks is paged. The remaining subset is not determined to be displayed on the unemployed normal regions like the part of the second set of blocks.

At step 337, the computing device re-compares area of the remaining subset of the second set of blocks (RS area) with the total area of the unemployed normal regions.

If the area of the remaining subset of the second set of blocks is not more than the total area of the unemployed normal regions, the process flow chart 300 continues to execute step 339.

At step 339, the computing device re-determines the unemployed normal regions for displaying the remaining subset of the second set of blocks in accordance with the region shapes and region areas of the corresponding blocks being matched the region shapes and region areas of the unemployed normal regions.

At step 340, the computing device deploys the one or more user interface elements related to the one or more broken-faulty regions on the screen based on result of the determining, for instance, the result of the determining in step 339.

If the area of the remaining subset of the second set of blocks is larger than the area of the unemployed normal regions, the process flow chart 300 proceeds back to execute step 333. Furthermore, the computing device loops the determining and the paging and the re-comparing for residue part of the remaining subset of the second set of blocks generated in last determining. The looping is continued to be executed based on result of last re-comparing until the residual part of the remaining subset of the second set of blocks generated in the last determining is not larger than area of the unemployed normal regions. As a result of the looping, all blocks of the second set of blocks are determined and re-determined to be displayed on the unemployed normal regions.

Figure 7B:
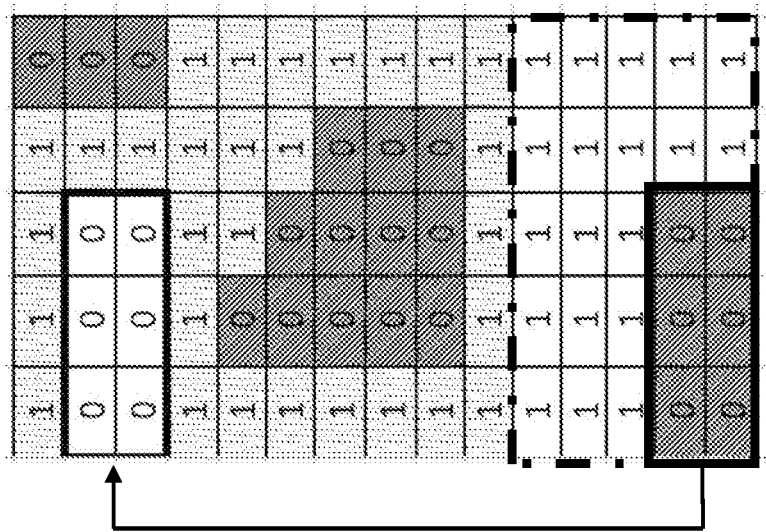
FIG. 7B depicts another example interface for implementing the method in FIG. 6A according to embodiments of the present disclosure.
Figure 7A:
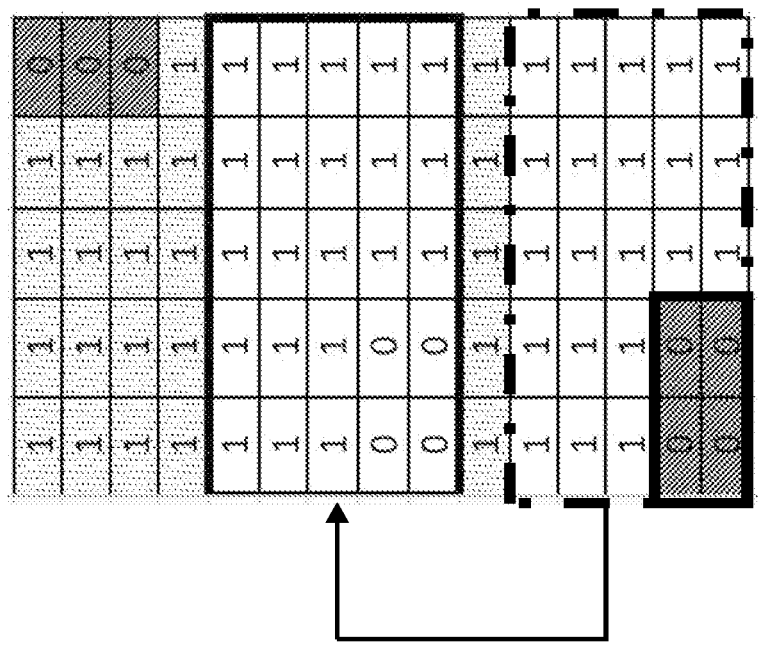
FIG. 7A depicts an example interface for implementing the method in FIG. 6A according to embodiments of the present disclosure.

With reference now to FIG. 7A, an example interface for implementing the method in FIG. 6A is depicted according to embodiments of the present disclosure.

An examination for the screen of the computing device is triggered to start to detect broken-faulty regions on the screen. For the examination, the screen is divided into a set of grids which comprises a plurality of rectangles grid units with same areas. Furthermore, the screen is tested to identify the function status of the screen in accordance with grid units of the grids. In accordance with the testing result, a matrix of grids is generated to record related information for indicating the one or more broken-faulty regions and/or the normal regions on the screen. Area of the set of grids is equal to area of the screen of the computing device, thus, the matrix records the functional statuses about the whole screen by means of the grids. In the embodiment of the present disclosure in FIG. 7A, a grid unit of the grids is given a status value 1 if the grid unit of the grids is in a normal function status. A grid unit of the grids is given a status value 0 if the gird unit of the grids is in a function status of broken-faulty. The matrix also records corresponding position and area of each grid unit of the girds for mapping the user interface elements with the broken-faulty regions based on the grids. A set of user interface elements, which is labeled in a dot-dash line box, is divided into 5×5 grids composed of the rectangle grid unit on the screen. The set of user interface elements is mapped with the matrix of girds. A part of the set of user interface elements, which is labeled by a broad solid line box, is identified to be related to broken-faulty regions of the screen. The part of the set of user interface elements related to broken-faulty regions of the screen is divided into 2×2 grids. In accordance with the information recorded in the matrix of grids, it is recognized that normal regions on the screen comprise a maximum internal consecutive normal subregion and area of a maximum internal consecutive normal subregion is obviously more than 2×2 grids which is equal to the area of user interface elements related to the broken-faulty regions and is also more than 5×5 grids which is equal to the area of user interface elements. As a result, a block of 5×5 grids, which is labeled by another broad solid line box, in the maximum internal consecutive normal subregion is determined for displaying the all set of user interface elements. Furthermore, the all set of user interface elements is deployed on the screen with the block of 5×5 grids determined for displaying the all set of user interface elements.

With reference now to FIG. 7B, another example interface for implementing the method in FIG. 6A is depicted according to embodiments of the present disclosure.

As shown in FIG. 7B, compared with the embodiment depicted in FIG. 7A, the screen of the computing device is tested to find out more (or bigger) broken-faulty regions on the screen. Thus, area of the maximum internal consecutive normal subregion in FIG. 7B is less than the area of the set of user interface element (5×5 grids), but more than current area of the part of the set of user interface elements (3×2 grids). As a result, a block of 3×2 grids in the maximum internal consecutive normal subregion, which is labeled by another broad solid line box depicted in FIG. 7B, is determined to be a region for displaying the part of the set of user interface elements.

Figure 7C:
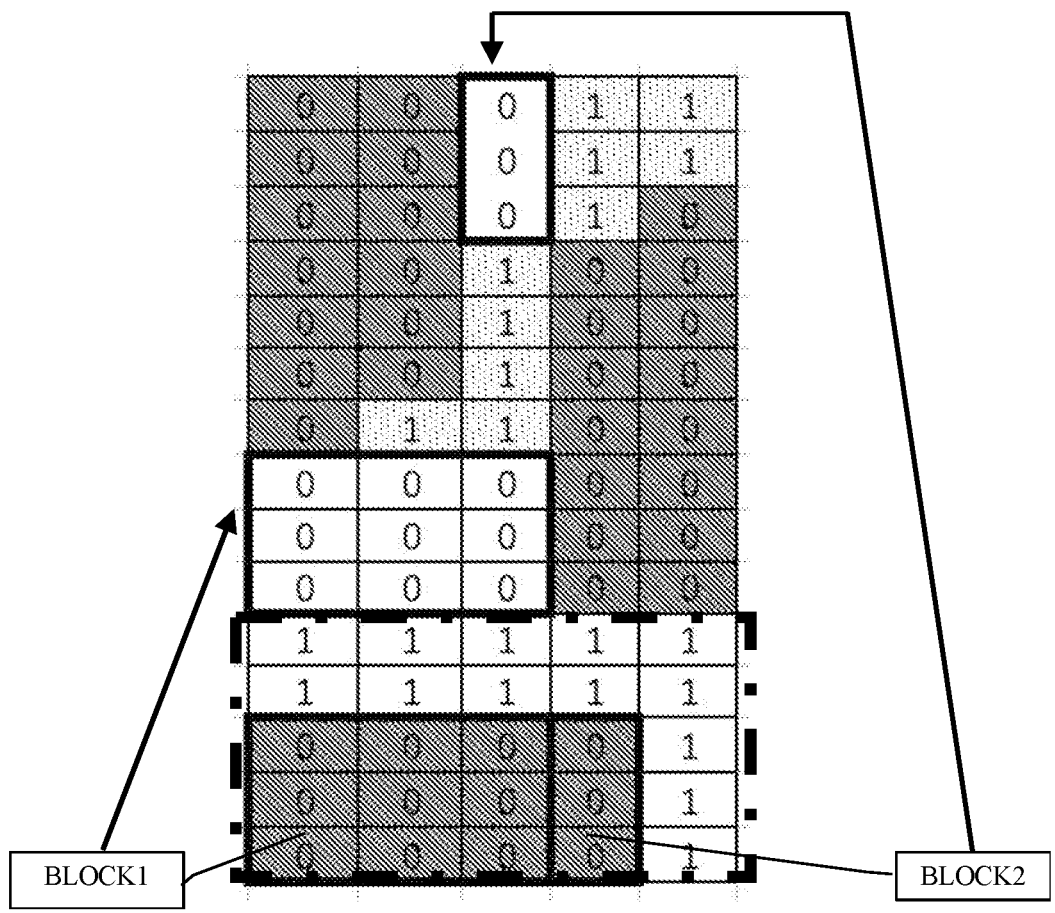
FIG. 7C depicts still another example interface for implementing the method in FIG. 6A according to embodiments of the present disclosure.

With reference now to FIG. 7C, another example interface for implementing the method in FIG. 6A is depicted according to embodiments of the present disclosure.

As shown in FIG. 7C, compared with the embodiment depicted in FIG. 7B, the screen of the computing device in FIG. 7C is tested to find out more (or bigger) broken-faulty regions on the screen, and area of the part of the set of user interface elements related to broken-faulty regions of the screen is increased to 4×3 grids. As a result, area of the maximum internal consecutive normal subregion in FIG. 7C is less than both of the total area of the set of user interface element and the area of the part of the set of user interface elements which is related to broken-faulty regions. But the total area of unemployed normal regions is still larger than the area of the part of the set of user interface elements. As a result, the part of the set of user interface elements which are related to the broken-faulty regions is split into two blocks, for instance, block1 and block2, in accordance with region shapes and region areas of a part of the normal regions. In the embodiment in FIG. 7C, block1 comprises 3×2 grids and block2 comprises 1×3 grids. The present splitting method for generating block1 or block2 is not the only one and other splitting method for generating a set of blocks might be existed. Furthermore, at least a part of the unemployed normal regions is determined to be respective regions for displaying block1 and block2 in accordance with the region shapes and region areas of the corresponding blocks being matched with the region shapes and region areas of the at least a part of the unemployed normal regions.

Figure 7D:
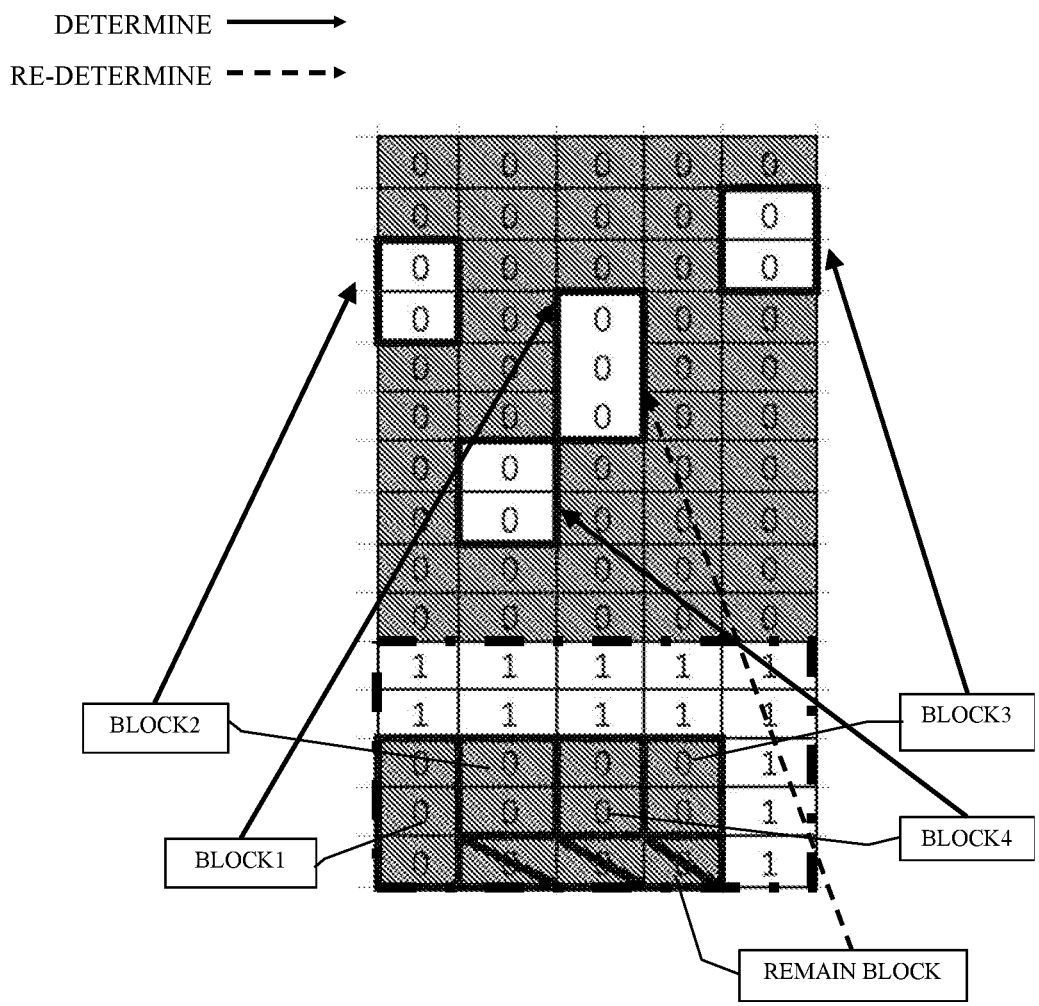
FIG. 7D depicts yet another example interface for implementing the method in FIG. 6A according to embodiments of the present disclosure.

With reference now to FIG. 7D, another example interface for implementing the method in FIG. 6A is depicted according to embodiments of the present disclosure.

As shown in FIG. 7D, compared with the embodiment in FIG. 7C, the screen of the computing device depicted in FIG. 7D is tested to find out more (or bigger) broken-faulty regions on the screen, and area of the part of the set of user interface elements related to broken-faulty regions of the screen is still 4×3 grids. It can be found that the total area of the unemployed normal regions in FIG. 7D is less than the area of the part of the set of user interface elements. As a result, the part of the set of user interface elements which are related to the broken-faulty regions is split into five blocks labeled as block1, block2, block3, block4 and a remaining block, in accordance with region shapes and region the unemployed normal regions. In the embodiment in FIG. 7C, block1 comprises 1×3 grids, block2 comprises 1×2 grids, block3 comprises 1×2 grids and block4 comprises 1×2 grids. Except for blocks from 1 to 4, the remaining block comprised 3×1 grids. Other splitting methods for generating a set of blocks might be used. Furthermore, the unemployed normal regions are determined to be regions for displaying blocks from 1 to 4 in accordance with the region shapes and region areas of the corresponding blocks being matched with the region shapes and region areas of the unemployed normal regions. The remaining block comprising 3×1 grids is paged for display delay. Furthermore, the remaining block is re-compared with the total area of unemployed normal regions. If the area of the remaining block is equal to a region of the unemployed normal regions depicted in FIG. 7D, the region of the unemployed normal regions is re-determined to be a region for displaying the remaining block.

Figure 8:
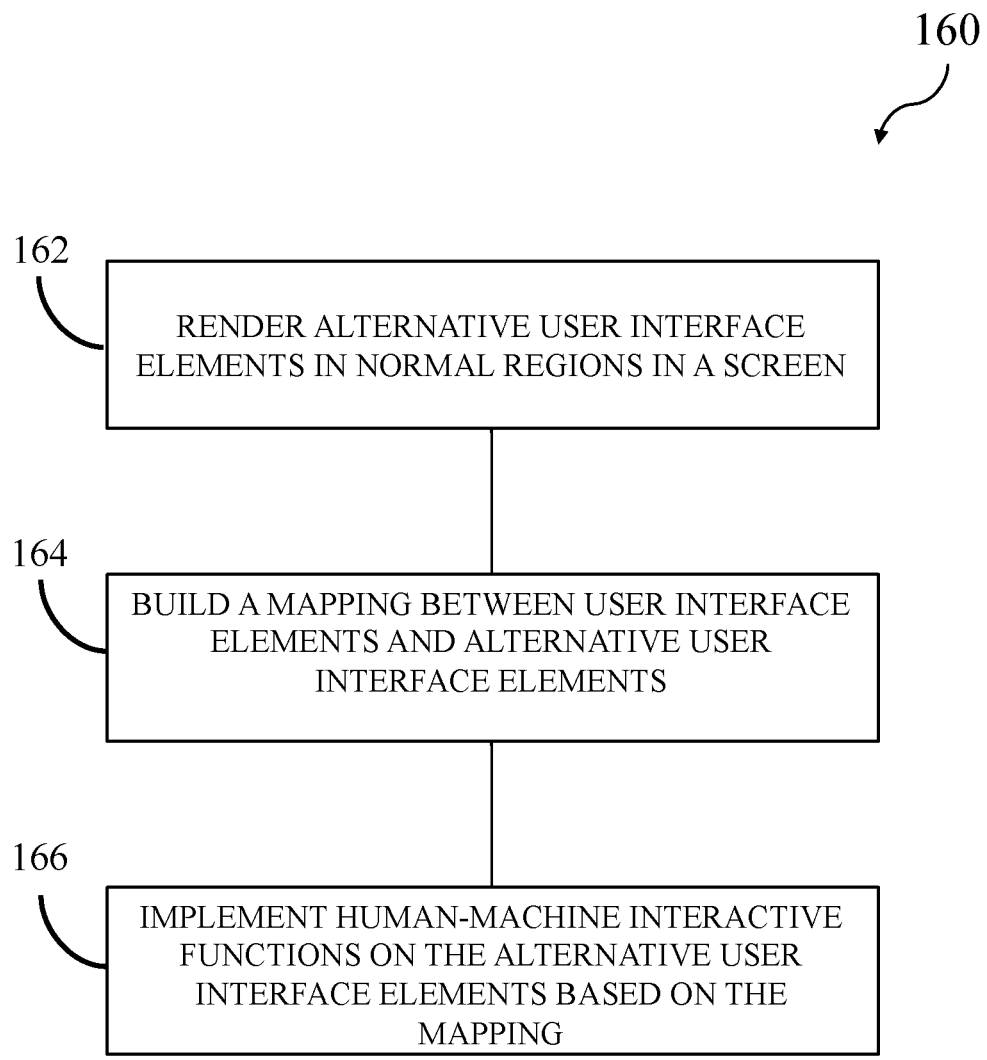
FIG. 8 depicts a flow chart of a method for implementing step 160 in FIG. 1 according to embodiments of the present disclosure.

With reference now to FIG. 8, a flow chart of a method for implementing step 160 in FIG. 1 is depicted according to embodiments of the present disclosure.

The example operation in FIG. 8 is in accordance with deploying the at least a part of the one or more user interface elements on the screen to implement normal human-machine interactive functions based on result of the determining in method depicted in FIG. 2. Also, the example operation in FIG. 8 could be comprised in the example methods depicted in FIG. 3 and FIG. 6 for gaining the desired effect.

The process flow of the example operation in FIG. 8 begins at step 162, where the computing device renders a set of alternative user interface elements corresponding to the at least a part of the one or more user interface elements in the at least a part of the normal regions on the screen of computing device. In some examples, the set of alternative user interface elements is the same as the at least a part of the one or more user interface elements. In other examples, shape of the set of alternative user interface elements is adjusted to be suitable for displaying on the at least a part of the normal regions.

At step 164, the computing device builds a functional and feature values mapping between the at least a part of the one or more user interface elements and the set of alternative user interface elements. For instance, the functional and feature values mapping records information about functional and feature values of each element of the at least a part of the one or more user interface elements. The functional values indicate each element might execute functions in response to user input, such as single click the element to open a specific software, etc. The feature values indicate features of each element itself, such as area, color, shape, ASCII code, etc. In according to the functional and feature values mapping, the computing device might build an accurate mapping relationship between the set of alternative user interface elements and the at least a part of the one or more user interface elements to implement/restore normal human-machine interactive functions of the at least a part of the one or more user interface elements by means of the set of alternative user interface elements in a broken or faulty screen.

At step 166, the computing device implements normal human-machine interactive functions on the screen based on the mapping.

Figure 9:
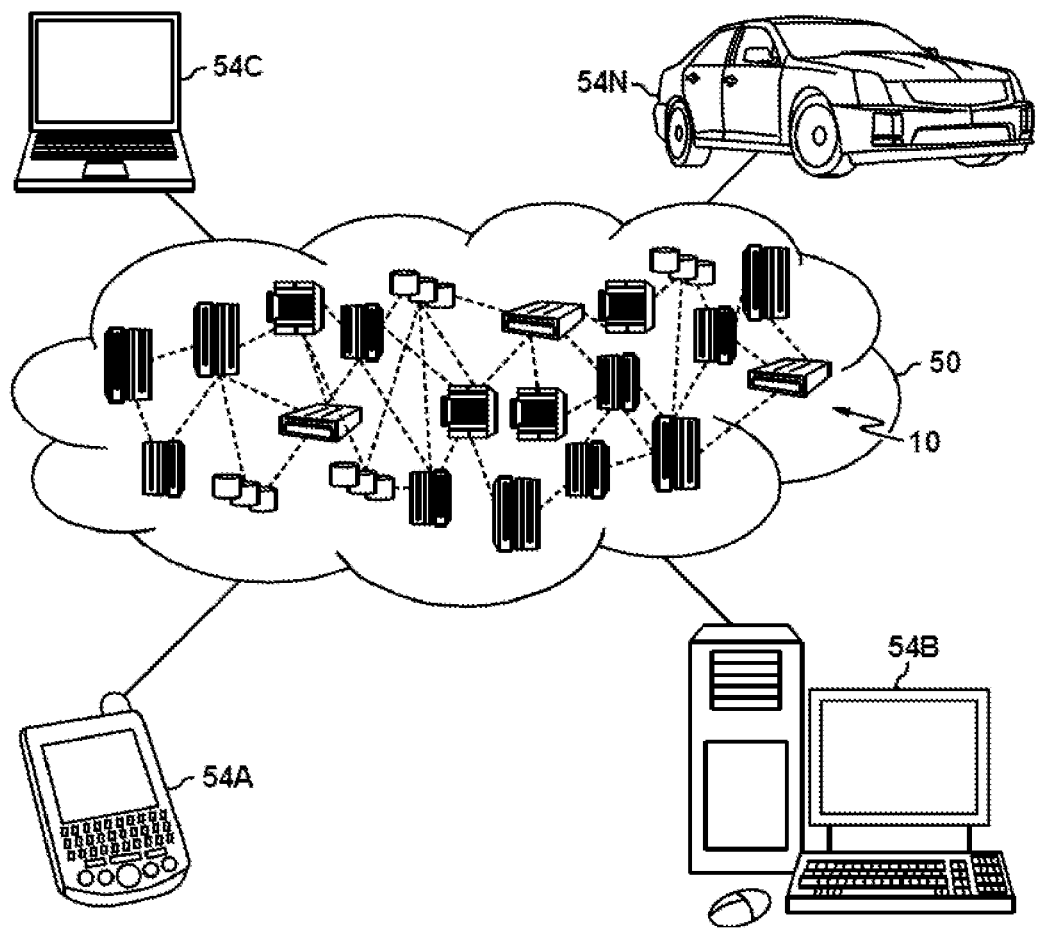
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 10:
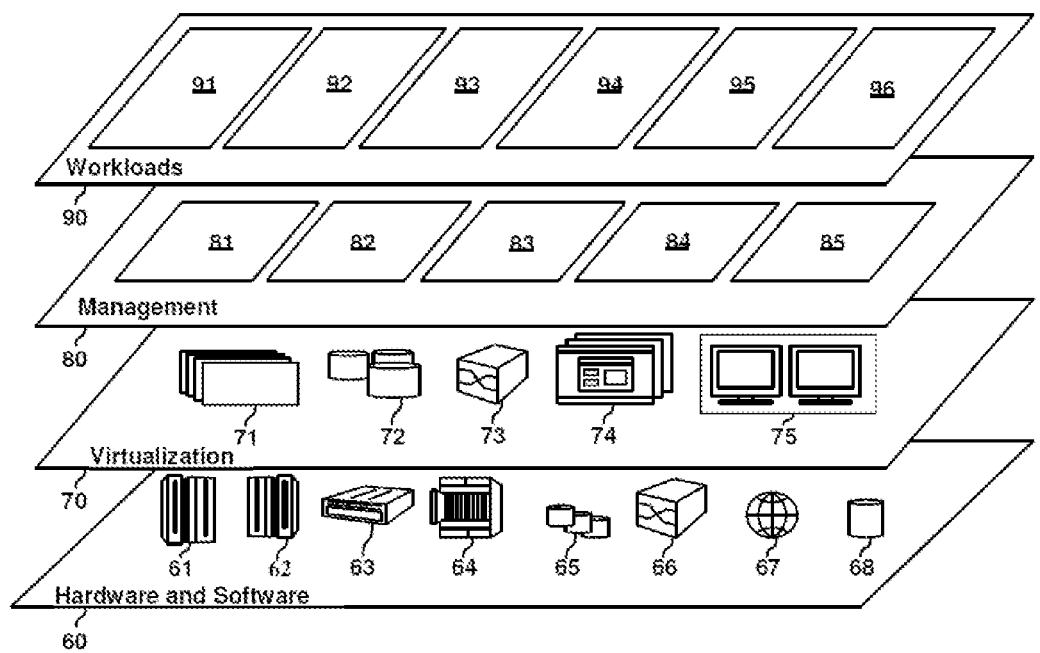
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and screen display 96.

It should be noted that the processing of deploying user interface elements in screens according to embodiments of this disclosure could be implemented by computing nodes 10 shown in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting one or more broken-faulty regions on a screen;
   mapping a plurality of user interface elements with regions on the screen;
   identifying one or more user interface elements of the plurality of user interface elements related to the one or more broken-faulty regions based on the mapping, wherein the one or more user interface elements is less than all of the plurality of user interface elements;
   identifying a maximum internal consecutive normal subregion in normal regions;
   determining at least a part of normal regions on the screen of the computing device to be a region for displaying the one or more user interface elements based on comparing total area of the plurality of user interface elements with an area of the maximum internal consecutive normal subregion; and
   deploying the one or more user interface elements on the screen.

2. The method of claim 1, wherein the detecting one or more broken-faulty regions on a screen of a computing device further comprises:
   dividing the screen into a set of grids;
   testing at least one grid in the set of grids to determine a function status of the at least one grid in the set of grids, wherein the function status is selected from the group consisting of broken-faulty and normal; and
   generating a matrix for recording the function status and position and area of the at least one grid in the set of grids for indicating the one or more broken-faulty regions and the normal regions.

3. The method of claim 2, wherein the testing at least one grid in the set of grids to determine a function status of the at least one grid in the set of grids further comprises:
   displaying a testing image in the at least one grid in the set of grids; and
   identifying the function status in the at least one grid in the set of grids in accordance with a displaying effect of the testing image.

4. The method of claim 2, wherein the mapping the plurality of user interface elements with regions on the screen further comprises:
   obtaining position and area of at least one of the plurality of user interface elements on the screen; and
   mapping the at least one of the plurality of user interface elements to the matrix.

5. The method of claim 4, wherein the identifying the one or more user interface elements related to the one or more broken-faulty regions is based on the position and area of the one or more user interface elements located in the one or more broken-faulty regions recorded in the matrix.

6. The method of claim 1, wherein the determining the at least a part of the normal regions to be a region for displaying the one or more user interface elements comprises:
   in response to the total area of the plurality of user interface elements being not larger than the area of the maximum internal consecutive normal subregion, determining the maximum internal consecutive normal subregion to be a region for displaying the plurality of user interface elements.

7. The method of claim 1, wherein the determining the at least a part of the normal regions to be a region for displaying the one or more user interface elements further comprises:
   in response to the total area of the plurality of user interface elements being larger than the area of the maximum internal consecutive normal subregion, comparing area of the one or more user interface elements with the area of the maximum internal consecutive normal subregion; and
   in response to the area of the one or more user interface elements being not larger than the area of the maximum internal consecutive normal subregion, determining the maximum internal consecutive normal subregion to be a region for displaying the one or more user interface elements.

8. The method of claim 1, wherein the determining the at least a part of the normal regions to be a region for displaying the one or more user interface elements further comprises:
   in response to the total area of the plurality of user interface elements being larger than the area of the maximum internal consecutive normal subregion, comparing area of the one or more user interface elements with the area of the maximum internal consecutive normal subregion;
   in response to the area of the one or more user interface elements being larger than the area of the maximum internal consecutive normal subregion, comparing the area of the one or more user interface elements with total area of unemployed normal regions;
   in response to the area of the one or more user interface elements being not more than the total area of the unemployed the normal regions, splitting the one or more user interface elements to generate a set of blocks in accordance with region shapes and region areas of the at least a part of the unemployed normal regions; and
   determining the at least a part of the unemployed normal regions to be regions for displaying corresponding blocks of the set of blocks.

9. The method of claim 1, wherein the determining the at least a part of the normal regions to be a region for displaying the one or more user interface elements further comprises:
   in response to the total area of the plurality of user interface elements being larger than the area of the maximum internal consecutive normal subregion, comparing area of the one or more user interface elements with the area of the maximum internal consecutive normal subregion;
   in response to the area of the one or more user interface elements being larger than the area of the maximum internal consecutive normal subregion, comparing the area of the one or more user interface elements with total area of unemployed normal regions;
   in response to the area of the at least a part of the one or more user interface elements being more than the total area of the unemployed normal regions, splitting, the one or more user interface elements to generate a set of blocks in accordance with region shapes and region areas of the unemployed normal regions;
   determining the unemployed normal regions to be region for displaying a part of the set of blocks, wherein area of the part of the set of blocks is not more than the total area of the unemployed normal regions;
   paging a remaining subset of the set of blocks corresponding to the part of the set of blocks to delay displaying the remaining subset of the set of blocks;
   re-comparing area of the remaining subset of the set of blocks with the total area of the unemployed normal regions;
   in response to the area of the remaining subset of the set of blocks being not larger than the area of the unemployed normal regions, re-determining the unemployed normal regions to be regions for displaying the remaining part of the plurality of corresponding blocks.

10. The method of claim 1, wherein the determining the at least a part of the normal regions to be a region for displaying the one or more user interface elements further comprises:
    in response to the total area of the plurality of user interface elements being larger than the area of the maximum internal consecutive normal subregion, comparing area of the one or more user interface elements with the area of the maximum internal consecutive normal subregion;
    in response to the area of the one or more user interface elements being larger than the area of the maximum internal consecutive normal subregion, comparing the area of the one or more user interface elements with total area of unemployed normal regions;
    in response to the area of the at least a part of the one or more user interface elements being more than the total area of the unemployed normal regions, splitting, the one or more user interface elements to generate a set of blocks in accordance with region shapes and region areas of the unemployed normal regions;
    determining the unemployed normal regions to be region for displaying a part of the set of blocks, wherein area of the part of the set of blocks is not more than the total area of the unemployed normal regions;
    paging a remaining subset of the set of blocks corresponding to the part of the set of blocks to delay displaying the remaining subset of the set of blocks;
    re-comparing area of the remaining subset of the set of blocks with the total area of the unemployed normal regions;
    in response to the area of the remaining subset of the set of blocks being larger than the area of the unemployed normal regions, determining the unemployed normal regions to be regions for displaying a part of the remaining subset of the set of blocks; and
    looping the determining and the paging and the re-comparing for residue of the remaining subset of the set of blocks based on result of last re-comparing to determine and re-determine all blocks of the set of blocks to be displayed on the unemployed normal regions.

11. The method of claim 1, wherein the screen of the computing device is a touch screen.

12. The method of claim 11, wherein the plurality of user interface elements are keys of a virtual keyboard.

13. The method of claim 11, wherein the deploying the one or more user interface elements on the screen further comprises:
    rendering a set of alternative user interface elements in the at least a part of normal regions, wherein the set of alternative user interface elements corresponds to the one or more user interface elements;

building a mapping between the one or more user interface elements and the set of alternative user interface elements; and implementing normal human-machine interactive functions on the set of alternative user interface elements based on the mapping.

14. A system for computing, the system comprising at least one processor and a memory storing program instructions thereon, the program instructions executable by the at least processor to cause the system to perform a method comprising:

detecting one or more broken-faulty regions on a screen;

mapping a plurality of user interface elements with regions on the screen;

identifying one or more user interface elements of the plurality of user interface elements related to the one or more broken-faulty regions based on the mapping, wherein the one or more user interface elements is less than all of the plurality of user interface elements;

identifying a maximum internal consecutive normal subregion in normal regions;

determining at least a part of normal regions on the screen of the computing device to be a region for displaying the one or more user interface elements based on comparing total area of the plurality of user interface elements with an area of the maximum internal consecutive normal subregion; and deploying the one or more user interface elements on the screen.

15. A computer program product, the computer program product comprising a computer readable storage medium having program instructions embodied therewith, the program instructions executable by at least one processor to cause the at least one processor to perform a method comprising:

detecting one or more broken-faulty regions on a screen;

mapping a plurality of user interface elements with regions on the screen;

identifying one or more user interface elements of the plurality of user interface elements related to the one or more broken-faulty regions based on the mapping, wherein the one or more user interface elements is less than all of the plurality of user interface elements;

identifying a maximum internal consecutive normal subregion in normal regions;

determining at least a part of normal regions on the screen of the computing device to be a region for displaying the one or more user interface elements based on comparing total area of the plurality of user interface elements with an area of the maximum internal consecutive normal subregion; and deploying the one or more user interface elements on the screen.

16. The computer program product of claim 15, wherein the determining the at least a part of the normal regions to be a region for displaying the one or more user interface elements comprises:

in response to the total area of the plurality of user interface elements being not larger than the area of the maximum internal consecutive normal subregion, determining the maximum internal consecutive normal subregion to be a region for displaying the plurality of user interface elements.

17. The computer program product of claim 16, wherein the determining the at least a part of the normal regions to be a region for displaying the one or more user interface elements comprises:

in response to the total area of the plurality of user interface elements being larger than the area of the maximum internal consecutive normal subregion, comparing area of the one or more user interface elements with the area of the maximum internal consecutive normal subregion; and in response to the area of the one or more user interface elements being not larger than the area of the maximum internal consecutive normal subregion, determining the maximum internal consecutive normal subregion to be a region for displaying the one or more user interface elements.

18. The computer program product of claim 17, wherein the determining the at least a part of the normal regions to be a region for displaying the one or more user interface elements comprises:

in response to the area of the one or more user interface elements being larger than the area of the maximum internal consecutive normal subregion, comparing the area of the one or more user interface elements with total area of unemployed normal regions;

in response to the area of the one or more user interface elements being not more than the total area of the unemployed the normal regions, splitting the one or more user interface elements to generate a first set of blocks in accordance with region shapes and region areas of the at least a part of the unemployed normal regions; and determining the at least a part of the unemployed normal regions to be regions for displaying corresponding blocks of the first set of blocks.

19. The computer program product of claim 18, wherein the determining the at least a part of the normal regions to be a region for displaying the one or more user interface elements comprises:

in response to the area of the at least a part of the one or more user interface elements being more than the total area of the unemployed normal regions, splitting, the one or more user interface elements to generate a second set of blocks in accordance with region shapes and region areas of the unemployed normal regions;

determining the unemployed normal regions to be region for displaying a part of the second set of blocks, wherein area of the part of the second set of blocks is not more than the total area of the unemployed normal regions;

paging a remaining subset of the second set of blocks corresponding to the part of the second set of blocks to delay displaying the remaining subset of the second set of blocks;

re-comparing area of the remaining subset of the second set of blocks with the total area of the unemployed normal regions;

in response to the area of the remaining subset of the second set of blocks being not larger than the area of the unemployed normal regions, re-determining the unemployed normal regions to be regions for displaying the remaining part of the plurality of corresponding blocks.

20. The computer program product of claim 18, wherein the determining the at least a part of the normal regions to be a region for displaying the one or more user interface elements comprises:

in response to the area of the remaining subset of the second set of blocks being larger than the area of the unemployed normal regions, determining the unemployed normal regions to be regions for displaying a part of the remaining subset of the second set of blocks; and looping the determining and the paging and the re-comparing for residue of the remaining subset of the second set of blocks based on result of last re-comparing to determine and re-determine all blocks of the second set of blocks to be displayed on the unemployed normal regions.

* * * * *